United States Patent [19]

Skoff

[11] Patent Number: 5,431,443
[45] Date of Patent: Jul. 11, 1995

[54] SUPPORTING DEVICE FOR A RESCUE VEHICLE

[75] Inventor: Gerhard Skoff, Vienna, Austria

[73] Assignee: Steyr-Daimler-Puch AG, Vienna, Austria

[21] Appl. No.: 284,820

[22] Filed: Aug. 2, 1994

[30] Foreign Application Priority Data

Aug. 4, 1993 [AT] Austria .................. 1558/93

[51] Int. Cl.⁶ .......................................... B60S 9/10
[52] U.S. Cl. ........................... 280/764.1; 212/304; 254/423
[58] Field of Search ............ 280/763.1, 764.1, 765.1, 280/766.1, 475; 212/189; 254/423

[56] References Cited

U.S. PATENT DOCUMENTS

| 2,924,463 | 2/1960 | Livermont | 280/763.1 |
| 2,929,517 | 3/1960 | Phillips | 280/764.1 |
| 3,913,942 | 10/1975 | MacKenzie et al. | 280/764.1 |
| 4,023,828 | 5/1977 | MacKenzie et al. | 280/763.1 |
| 4,546,996 | 10/1985 | Hanson | 280/764.1 |
| 4,569,422 | 2/1986 | Hoffman | 280/764.1 X |
| 4,790,710 | 12/1988 | Ayalon | 280/764.1 X |

FOREIGN PATENT DOCUMENTS

| 3039364 | 5/1982 | Germany. | |
| 0594023 | 2/1978 | U.S.S.R. | 212/189 |
| 1418283 | 8/1988 | U.S.S.R. | 212/189 |

*Primary Examiner*—Brian L. Johnson
*Attorney, Agent, or Firm*—Meltzer, Lippe, Goldstein, Wolf, Schlissel & Sazer

[57] ABSTRACT

A supporting device for a rescue vehicle comprises two legs each of which has a footing plate (16) located near a lateral vehicle edge of the vehicle. The legs are capable of being swivelled from a transportation position to a supporting position. In order to create a light-weight supporting device which is nevertheless very effective in both the vertical and horizontal directions of towing, and easily retractable and accessible, the footing plates (16) are connected to the legs (13) so as to be capable of swivelling around a horizontal axis (30) and a vertical axis (31). Both footing plates (16) can be connected to each other to form a supporting shield.

8 Claims, 4 Drawing Sheets

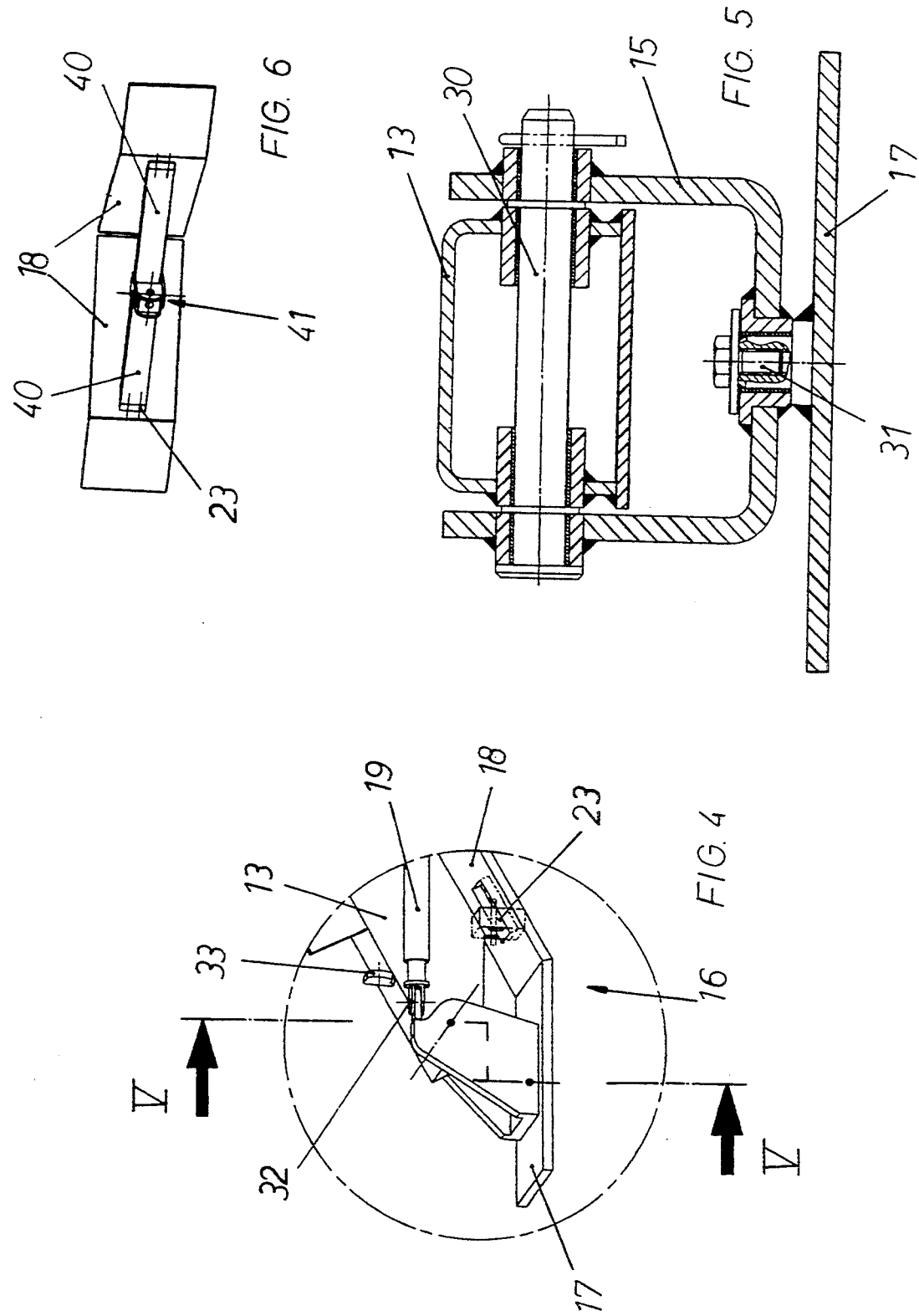

SUPPORTING DEVICE FOR A RESCUE VEHICLE

FIELD OF THE INVENTION

The instant invention relates to a supporting device for a rescue vehicle. The rescue vehicle has two legs with footing plates located near the lateral edge of the vehicle. The legs are capable of being swivelled from a transport position down into a supporting position.

BACKGROUND OF THE INVENTION

Supporting devices of this type serve to support the vehicle during the lifting of a load by means of a cantilever arm. The support is such that the vehicle's tilting edge is as close as possible to the intersection point of the load distribution line and the ground. For vehicles used in military rescue there are additional requirements. First, the vehicles must also provide protection to the transported repair crews and facilitate their covered egress and work. Therefore, stroke range adjustment and support, and also an egress door at the rear of the vehicle are provided. Furthermore, it is often necessary to tow a damaged vehicle by means of an on-board cable winch, especially if the vehicle is too heavy to be lifted. Such towing requires considerable tractive power. This tractive power exceeds the holding power of the brakes and the road adherence of the wheels in the case of wheeled vehicles. Therefore, a support in the horizontal direction is also required.

A plow shield for a rescue tank is known from DE-C 30 39 364. This plow shield provides support to the vehicle in the horizontal, as well as in the vertical, direction. However, the plow shield extends over the entire width of the vehicle, which not only leads to high weight and high costs, but also makes egress at the front side impossible. Furthermore, the horizontal support action of the plow shield is limited because the lower edge of the shield tends to lift off the ground in the manner of a bulldozer rather than to hold the vehicle on the ground.

It is, therefore, an object of the instant invention to create a light-weight and highly effective supporting device, in both traction directions, which is also easily retractable and accessible.

SUMMARY OF THE INVENTION

According to the invention this object and others is achieved by providing a supporting device for a rescue vehicle. First and second legs are mounted to the vehicle in such a way that the legs are capable of being swivelled from a transport position to a support position. First and second footing plates, respectively, are connected to the first and second legs at a point located near a lateral edge of the vehicle. The first and second footing plates are capable of being swivelled around a horizontal rotary axis and a vertical axis. The footing plates are also capable of being connected to each other to form a shield.

The footing plates are connected to brackets around a horizontal axis and a vertical axis in a rotatable manner. The two footing plates can be connected to each other to form a protective, supporting shield.

Thus, the footing plates can be brought into two working positions. To receive vertical forces, individually the footing plates lie flat on the ground, so that they do not sink in easily. To receive horizontal forces, the footing plates swivel around both axes and, thus, form a shield extending over the entire width of the vehicle.

The shield is pushed into the ground at the correct angle of incidence.

In one embodiment of the invention, each of the footing plates preferably comprises a foot plate and a shield plate which form an obtuse angle with each other. The shield plates of each leg can be connected to each other to form the protective shield extending over the entire vehicle width. The obtuse "V" shape of the shield favors support in the horizontal direction.

In a further embodiment of the invention, an articulated bracket is connected to each leg by a horizontal rotary axle and to the footing plate by a vertical pivot pin. The articulated bracket is provided between the leg and the footing plate. In this manner, the ability to pivot around the two axes is realized very simply and without a ball-and-socket joint.

In another embodiment of the invention, first and second struts are provided. Each of the struts preferably attaches to each of the articulated brackets, eccentrically in relation to the vertical pivot pin. The other end of each strut is attached to one of the legs. The strut retains the footing plate in the transport position, as well as in the work position, to absorb vertical forces. An additional attachment bracket to attach the strut to the leg can also be provided. This additional bracket makes it possible to hold the footing plate in a position to absorb horizontal forces.

In yet another embodiment of the invention, for additional reinforcement when horizontal forces are applied, a diagonal or pressure strut can be installed between the vehicle body and the shield plate. In still another embodiment of the invention, the plow or shield constituted by the footing plates can also be used to lift a damaged vehicle if the connecting means of the footing plates which are placed in the work position in front of the shield plates are bearing elements with a connection coupling.

BRIEF DESCRIPTION OF THE DRAWING

The invention is described and explained below with reference to the following drawings:

FIG. 4 shows an enlarged detail IV of FIG. 1;

FIG. 5 shows an enlarged section V—V of FIG. 4; and

FIG. 6 shows a variant of a detail in FIG. 1.

DETAILED DESCRIPTION OF THE INVENTION

Figure 1:
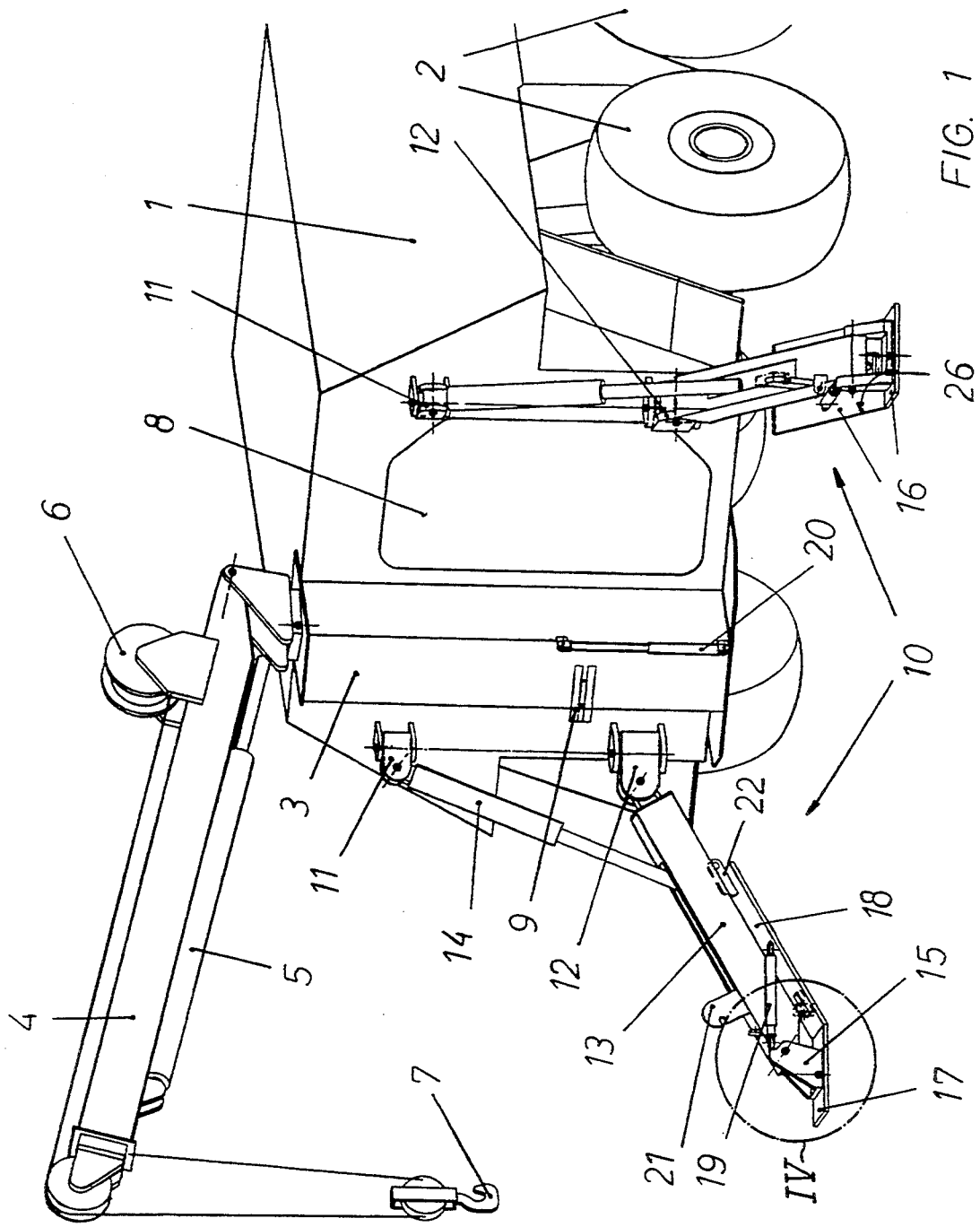
FIG. 1 shows a rescue vehicle with the device according to the invention in a first work position.

In FIG. 1 the body of the rescue vehicle is designated with reference 1 and the wheels with reference 2. A lower crane part 3 is attached to the vehicle body 1 and is equipped with the usual, not shown, lifting and rotating devices for a cantilever arm 4. The azimuth of the cantilever arm 4 can be adjusted by a lifting winch or cylinder 5. The cantilever arm 4 is provided with a lifting winch or cylinder 5 and a crane hook 7.

Figure 2:
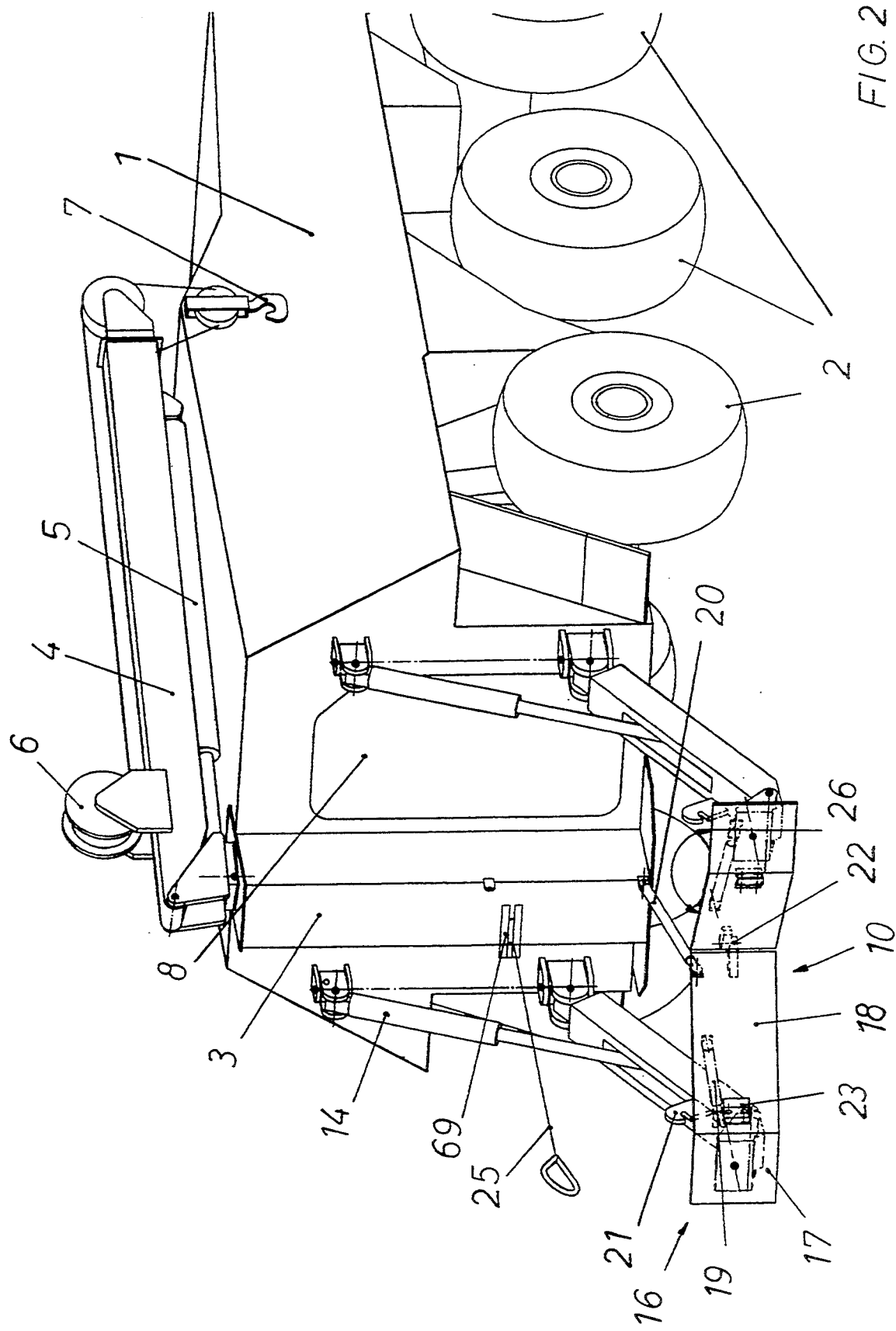
FIG. 2 shows the same rescue vehicle as in FIG. 1 in a second work position.

Additionally, an egress door 8 for the crew is provided at the rear of the vehicle 1. An outlet slit 9 for the traction cable 25, as shown in FIG. 2, of a cable winch is located inside the vehicle body 1 to exert an approximately horizontal traction force. Also, a pair of supporting devices 10 are installed.

The vehicle body 1 is provided with upper attachment eyelets 11 and lower attachment eyelets 12 for the supporting devices. At each set of lower attachment eyelets a leg 13, is mounted so as to be swivellable around a vertical axis and a horizontal axis. Hydraulic cylinders 14, which are supported by the upper attachment eyelets 11 on the vehicle body 1, engage the legs 13. A footing plate 16 is installed on each leg 13 via an articulated bracket 15 and a foot plate 17 at the outer end of each leg 13 in a movable manner. Each footing plate 16 consists of a foot plate 17 and a shield plate 18 which together form an obtuse angle 26. A strut 19 is provided between the shield plate 18 and the articulated bracket 15 or the leg 13. At the rear of the vehicle body 1, a diagonal pressure strut 20 is connected. The diagonal pressure strut shall be described in further detail below with reference to FIG. 2. The legs 13 are positioned in FIG. 1 so as to be able to transmit vertical forces to the ground when the vehicle is used as a crane. Nearly vertical forces act upon the crane hook 7.

FIG. 2 shows the same vehicle as FIG. 1, with the cable winch acting upon the cable 25. The supporting device 10 must, therefore, transmit nearly horizontal forces to the ground. For this purpose, the footing plates 16 are placed in a different position. The footing plates 16 push together to form a shield against the ground by swivelling around two axes placed orthogonally in relation to each other, as described below. The footing plates are supported by means of the connecting devices 22 via diagonal strut 20 on the vehicle body 1.

Figure 3:
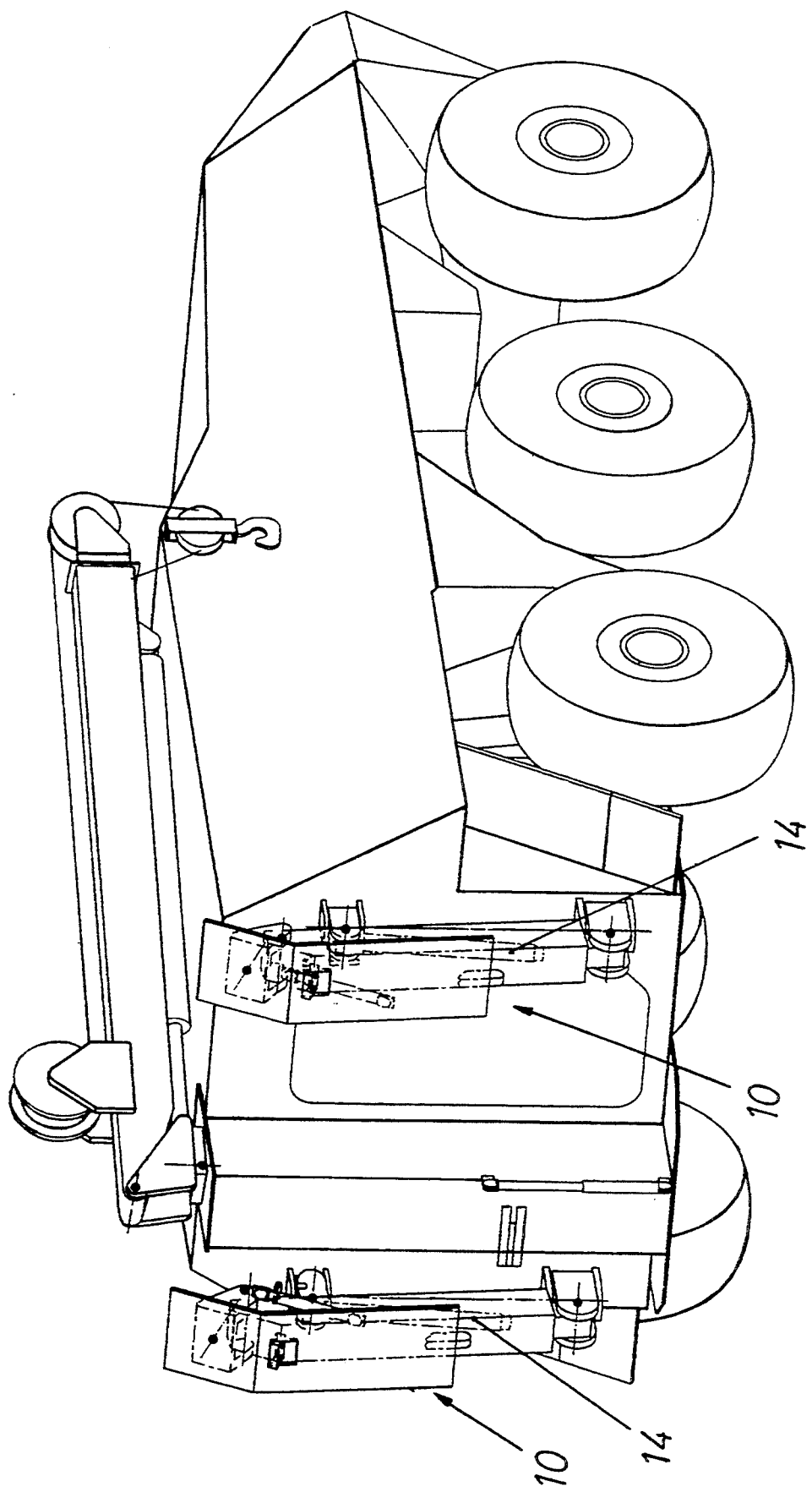
FIG. 3 shows the same vehicle as in FIG. 2 in a transport position.

FIG. 3 shows the same vehicle as FIG. 1, this time in the transportation position. The legs 13 are folded up completely by means of the hydraulic cylinders 14. The attachment eyelets 21, visible in FIG. 2, engage the upper attachment eyelets 11.

In FIGS. 4 and 5, the connection between a leg 13 and a footing plate 16 is shown in greater detail. A horizontal rotary axle 30 is provided between the leg 13 and the articulated bracket 15. The articulated bracket 15 can be swivelled around the horizontal axis. Furthermore, the articulated bracket 15 is connected by a vertical pivot pin 31 to the foot plate 17. The vertical pin 31 enables the articulated bracket 15 to rotate around the vertical axis of the vertical pivot pin 31. In the working position shown in FIG. 1, the strut 19, which is attached at one end to the shield plate 18, is supported at the other end on a first attachment eyelet 32. The attachment eyelet 32 is fixedly connected to the articulated bracket at a point which is eccentric in relation to the vertical pivot pin 31. The strut 19 thus holds the footing plates 16 in the position shown in FIG. 1.

If the footing plate 16 is to be brought into the working position shown in FIG. 2, the connection between the strut 19 and the first attachment eyelet 32 is disconnected. The footing plate 16 is first rotated around the vertical pivot pin 31. The articulated bracket 15 along with the footing plate 16 is then rotated around the horizontal rotary axis 30 until the foot plate 17 is nearly vertical. The two shield plates 18 are now connected to each other by means of the connecting element 22. The strut 19 is connected to a second attachment eyelet 33 which, contrary to the first attachment eyelet 32, is attached to the leg 13.

FIG. 6 shows yet another connection between the two shield plates 18. Supports 40 are attached by screws at the screw blocks 23 (see also FIGS. 2 and 5) and possibly at additional locations not shown. The supports 40 are connected to each other via a connection coupling 41. This connection coupling 41 can also be used to lift an axle of a damaged vehicle from the ground to be towed in this manner.

In all, an especially light-weight and versatile supporting device which is nevertheless able to transfer all the forces occurring in a rescue service to the ground is provided by the invention.

While the invention has been described by reference to a specific embodiment, this was for purposes of illustration only. Numerous alternative embodiments will be apparent to those skilled in the art and are considered to be within the scope of the invention.

I claim:

1. A supporting device for a rescue vehicle, comprising,
   first and second legs mounted to said vehicle, so that said legs are swivellable from a transport position to a support position,
   first and second footing plates connected to said first and second legs, respectively, and located near a lateral edge of said vehicle,
   first and second axis means for swivelling said first and second footing plates around a horizontal rotary axis and a vertical axis, and
   a connection means for connecting said first and second footing plates to each other in a vertical orientation to provide a supporting shield.

2. The supporting device of claim 1, wherein said first and second footing plates each comprises a foot plate and a shield plate joined together at an obtuse angle, and said connection means is disposed on said shield plate.

3. The supporting device of claim 1, comprising first and second articulated brackets connected to each of said legs, respectively, via said horizontal rotary axis means and to each of said footing plates, respectively, via said vertical axis means.

4. The supporting device of claim 3, further comprising first and second struts, each strut having one end attached to one of said first and second articulated brackets on a first attachment eyelet in an eccentric relation to said vertical axis means and another end attached to one of said first and second legs.

5. The supporting device of claim 4, further comprising second attachment eyelet installed on each of said legs, wherein each of said struts attaches to said second attachment eyelet and holds said footing plate in position for a horizontal force transfer.

6. The supporting device of claim 4, further comprising a diagonal strut connected between said vehicle and said shield plates.

7. The supporting device of claim 2, wherein said connection means of said footing plates comprises supports having connection couplings which are located in front of said shield plates during a working position.

8. The supporting device of claim 3, wherein said vertical axis means comprises a vertical pivot pin.

* * * * *